Figure 8:
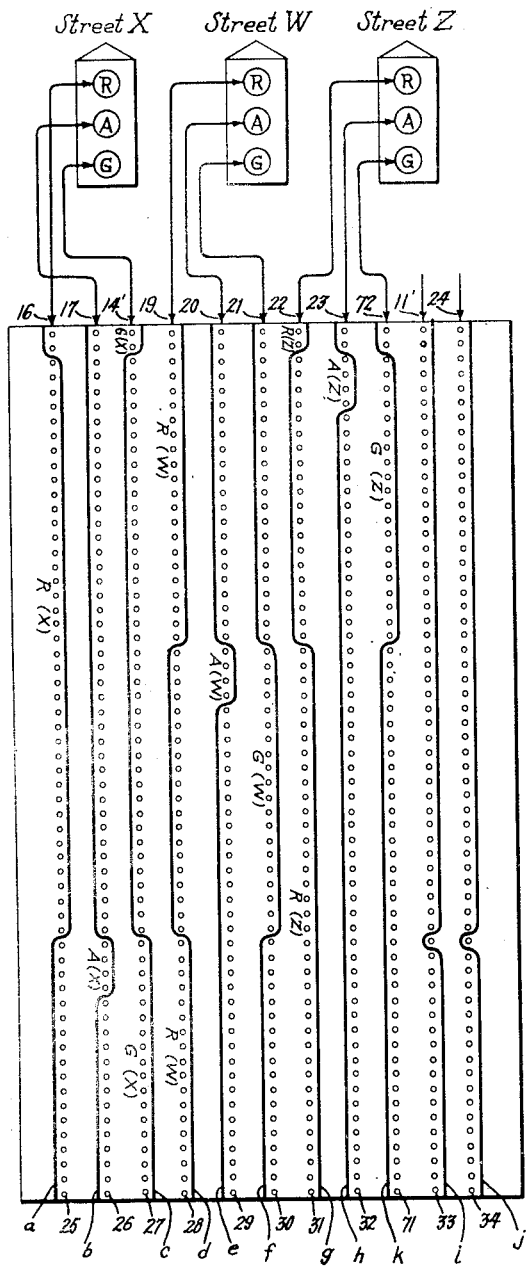

May 3, 1932. C. A. B. HALVORSON 1,856,832
CIRCUIT CONTROLLER
Filed Jan. 13, 1930 4 Sheets-Sheet 1
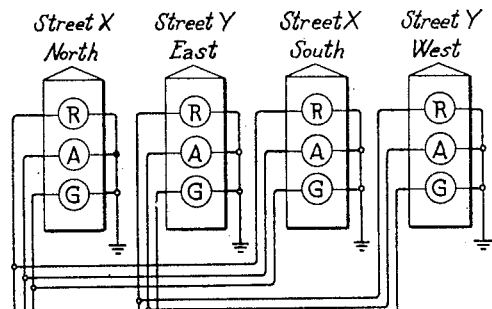
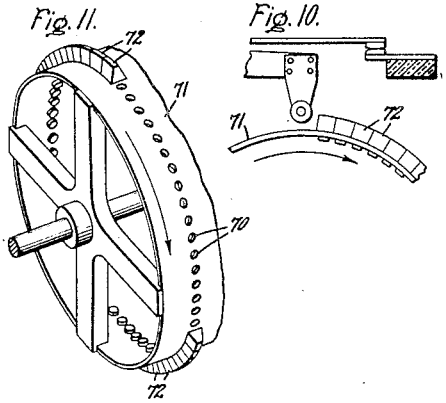
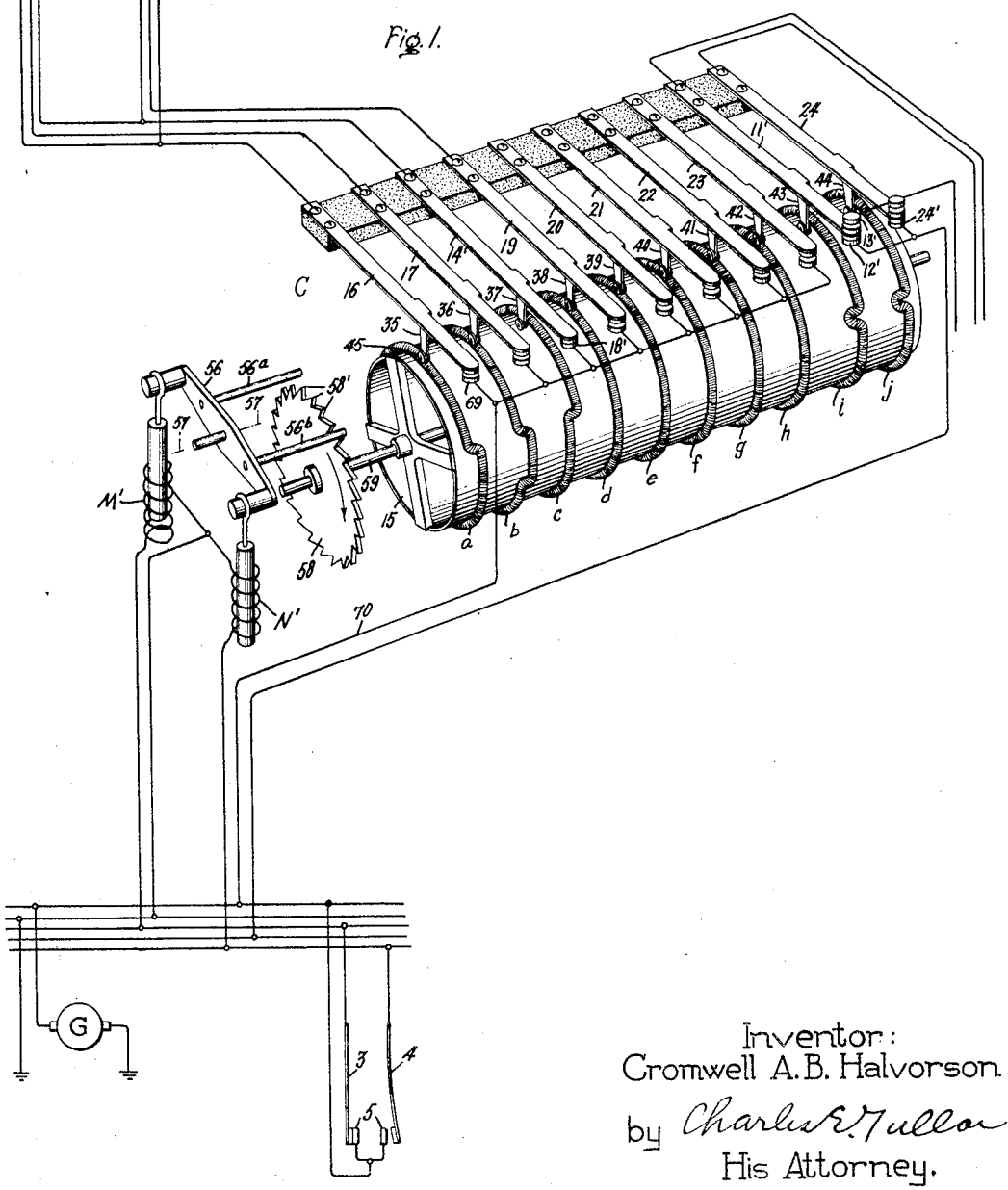
Inventor:
Cromwell A. B. Halvorson,
by Charles E. Mullen
His Attorney.

May 3, 1932.　　　C. A. B. HALVORSON　　　1,856,832
CIRCUIT CONTROLLER
Filed Jan. 13, 1930　　　4 Sheets-Sheet 2
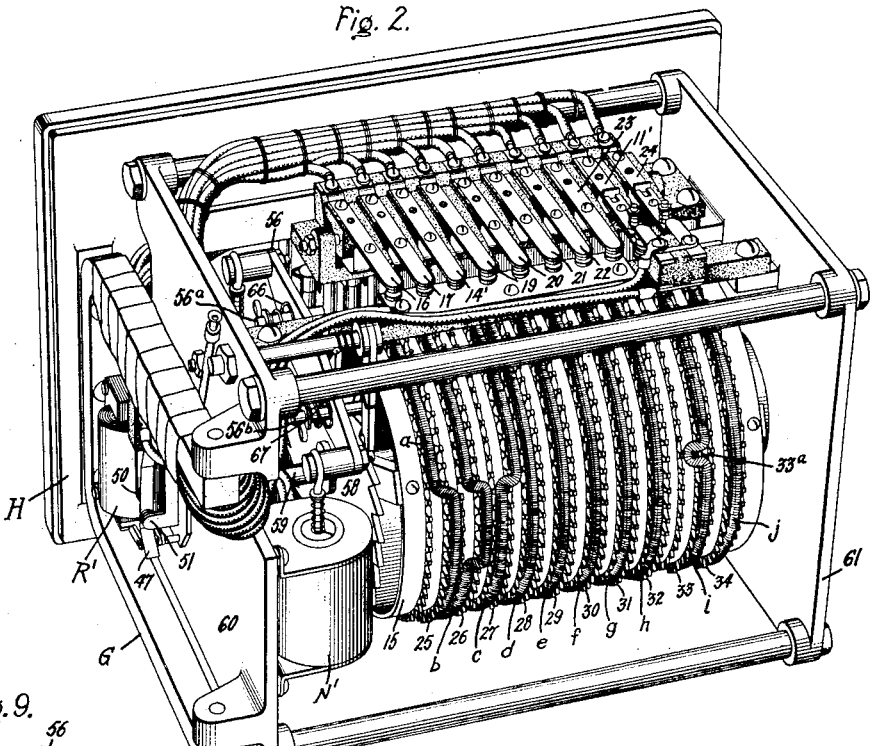
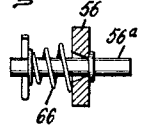
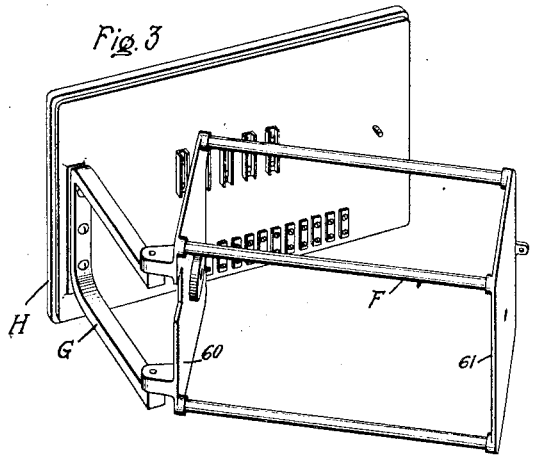
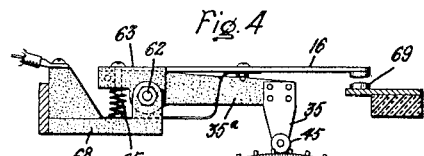
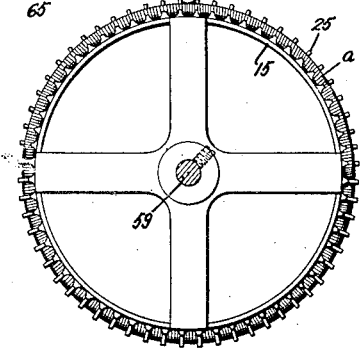
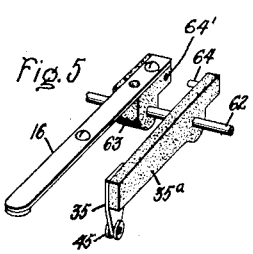
Inventor:
Cromwell A. B. Halvorson,
by Charles E. Tullar
His Attorney.

May 3, 1932.  C. A. B. HALVORSON  1,856,832
CIRCUIT CONTROLLER
Filed Jan. 13, 1930  4 Sheets-Sheet 3
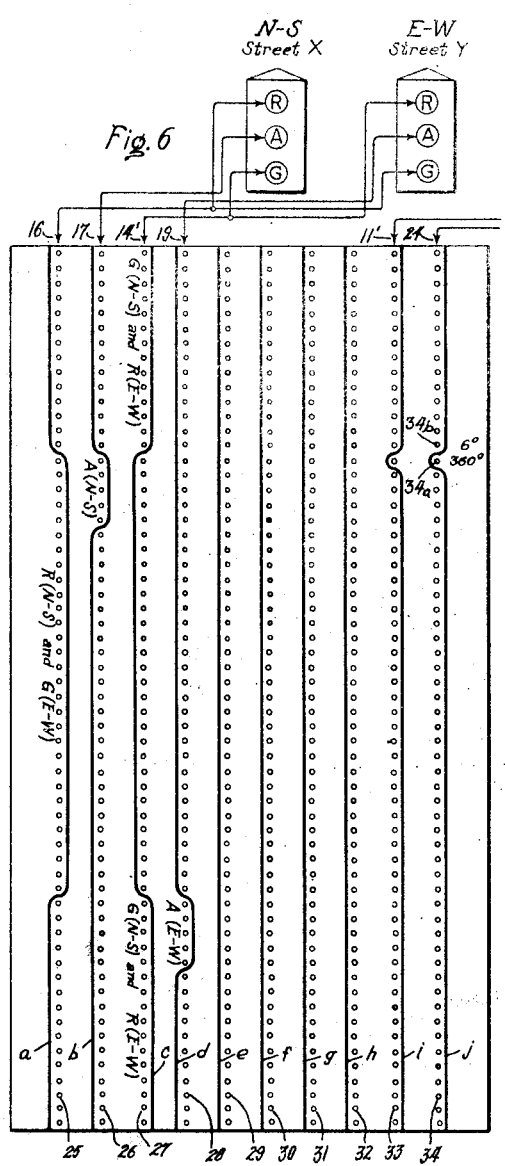
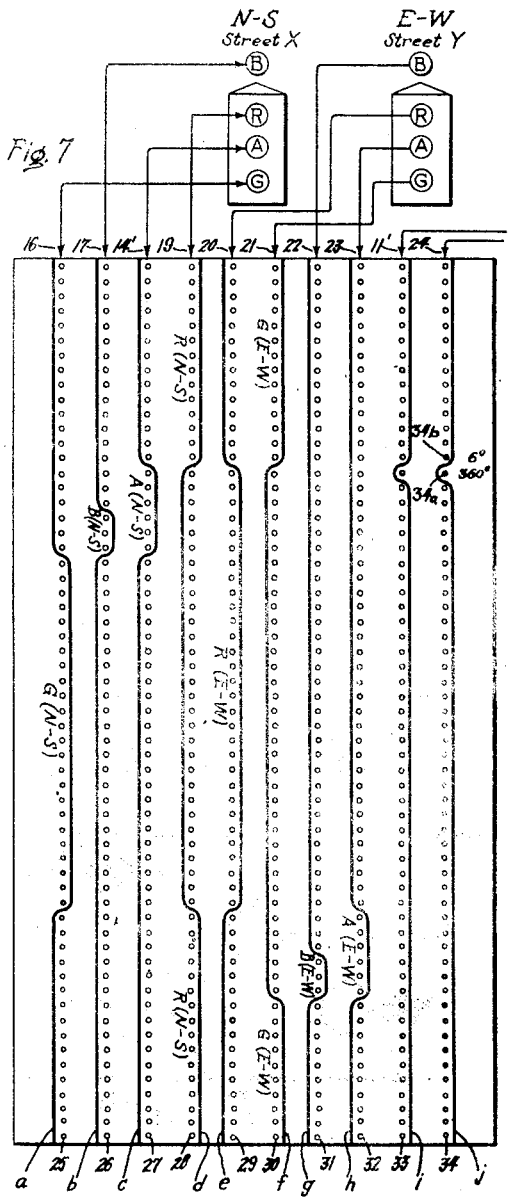
Inventor:
Cromwell A. B. Halvorson,
by Charles E. Mullen
His Attorney.

May 3, 1932.  C. A. B. HALVORSON  1,856,832
CIRCUIT CONTROLLER
Filed Jan. 13, 1930  4 Sheets-Sheet 4

Inventor:
Cromwell A. B. Halvorson,
by Charles E. Mullen
His Attorney.

Patented May 3, 1932

1,856,832

UNITED STATES PATENT OFFICE

CROMWELL A. B. HALVORSON, OF LYNN, MASSACHUSETTS, ASSIGNOR TO GENERAL ELECTRIC COMPANY, A CORPORATION OF NEW YORK

CIRCUIT CONTROLLER

Application filed January 13, 1930. Serial No. 420,348.

My invention relates to circuit controllers. More particularly it relates to controllers that are especially adapted for use in connection with signals such as traffic signals.

With the increase of traffic congestion traffic problems have also increased and their solutions have involved an increase in the number of independent signals with corresponding independent circuits. For example, it may be assumed that in the beginning of the art of traffic signaling it was possible to go along with only one signal, such as red, indicating stop, and the absence of red, indicating go. This arrangement would require only one circuit. It may be also assumed that later it became customary to use red for stop and green for go. This arrangement would require two circuits. It may be assumed also that still later there was used in addition the amber signal to indicate that a signal change was about to take place. This arrangement would require three circuits. Subsequently it became necessary that different percentages of amber should be assigned to different intersecting streets such as north and south and east and west streets. This arrangement necessitates placing, for example, the north and south amber on one circuit and the east and west amber on a different circuit. This last arrangement would require four circuits.

When it comes to the circuits for the signals for a three street intersection the matter becomes more complicated and it becomes necessary to put the red, green and amber signals assigned for each street, on a separate circuit each independent of the green, red and amber signal circuits of each other street. This, of course, means nine different circuits, and in some instances even more.

With the type of controller heretofore used, it has been possible to control effectively two, three or even four circuits through the medium of means such as cams and the like to vary the relation and the proportion of each signal with respect to any or every other one. But such means becomes too complicated in the case of a larger number of circuits.

One object of my invention is to provide a controller in which any suitable number of comparatively simple and readily adjustable cams can be readily provided for controlling corresponding circuits.

A further object of my invention is to provide a controller with means for operating any signal of a large group independently during any portion of a cycle.

The invention will be better understood by reference to the accompanying drawings, Fig. 1 of which shows more or less diagrammatically a controller comprising the features of the invention in a traffic signaling system. Fig. 2 shows in perspective the controller of Fig. 1 in full, located in its frame. Fig. 3 shows the base and a support for the controller hinged thereon, the support being shown swung out and in perspective. Fig. 4 is a transverse sectional view of the controller and shows the relation of one of the make and break contact switch devices for one of the signal circuits and the drum controller elements for operating said contact device. Fig. 5 shows the elements of the contact device of Fig. 4 separated to more clearly show the details of its construction. Fig. 6 shows diagrammatically a development of the drum controller, Fig. 2, in which four signal circuits and two reset circuits, or six circuits all told, are involved. Fig. 7 shows diagrammatically the development of a drum controller similar to that of Fig. 6, in which eight signal circuits and two reset circuits, or ten circuits all told, are used; Fig. 8 shows a similar development for nine signal circuits and two reset circuits, or eleven circuits in all; Fig. 9 shows the construction of the pin in the arm that drives the drum of the controller; and Figs. 10 and 11 show two views of a modified form of cam construction for the controller.

Referring more in detail to the drawings, the controller Fig. 2 comprises a rotatable drum 15 which is provided with a series of cams $a$ through $j$. Each of these cams is preferably made of flexible material, such as for example, coiled spring wire in the form of a flexible ring, see Fig. 4. Each of these cams has associated with it a corresponding ring of teeth 25 through 34 on the drum for cams *a* through *j*. The controller is also provided with a set of springs 16, 17, 14', 19 through 23, 11' and 24, each of which forms part of a make and break contact switch adapted to be connected in circuit with any suitable device such as a signal. This is diagrammatically shown in Fig. 1. In this figure the springs 16, 17, 14' and 19 are shown connected with a set of traffic signals R, A, G, (indicating respectively red-amber-green) at the intersection of streets X and Y. Each of these springs is provided with an arm and with a roller on the end thereof, which latter is adapted to ride on the corresponding cam. For example, the spring 16 is provided with an arm 35 and with a roller 45 on the end thereof, which latter is adapted to ride on the cam *a*, see Fig. 4. In Fig. 1 the arm is shown secured to the spring, but the preferred arrangement is shown in Fig. 5 where the spring 16 is shown secured to a body 63 of insulating material loosely mounted on a shaft 62. Similarly, arm 35 is shown secured to a body of insulating material 35*a*, also loosely mounted on the shaft 62, which latter is common to all the springs operated by the cams on the drum 15. The body 35*a* is provided with a pin 64, which, when the elements 63 and 35*a* are drawn together, as shown in Fig. 2, enters into a hole 64', thus interlocking the two elements. To the forward end of the element 35*a* the arm 35 is secured in any suitable manner and on the lower end of the latter the roller 45 is located in a position to engage its corresponding cam *a*. In Fig. 4 a spring 65 is shown interposed between the rear end of the elements 63 and the frame 68. The object of this spring is to give the element 63 a tendency to rotate in a clockwise direction as viewed in Fig. 4 so that when the roller 45 leaves the cam the spring 16 is carried into engagement with the corresponding contact 69 in the light signaling circuit. Obviously with the construction shown any movement of the arm 35 will cause a corresponding movement of the spring 16 about the shaft 62.

In Fig. 3 is shown the frame F on which the drum 15, the operating mechanism thereof, and the switching mechanism operated thereby comprising the springs 16, 17, etc., Figs. 1 and 2, are all mounted. This frame comprises a pair of heads 60 and 61 held together by tie rods as shown. This frame F is pivotally mounted on the brace G, which latter is secured in turn to the base H. On the outside of the head 60 I have shown in Fig. 2, a so-called reset relay R' which is no part of the present invention, but which is adapted to be energized or deenergized in any suitable manner from a distant point. The object of this relay is to shift the relay spring 47 back and forth between the corresponding contacts 50 and 51 for switching the control of the so-called reset circuit to either one or the other of the cam springs 11' or 24, Fig. 2.

With the construction and arrangement of elements shown in Fig. 2, and as indicated in Fig. 1, if a cam such as the cam *a* of spring 16 is located on the left side, Fig. 2, of its ring of teeth 25, the cam and the roller 45 will engage and operate the switch element 16; but if the cam is located on the opposite side of its ring of teeth the element 16 cannot be operated thereby. For example, if the cam *a* were located entirely on the right side of the ring of teeth 25 the roller 45 would at no time during the rotation of the drum engage with the cam. On the other hand, if the cam is located on the left hand side of the ring of teeth 25 the roller 45 will engage the cam at all times during the rotation of the drum 15. However, the cam, as stated, is flexible, and part of the cam *a* may be confined to one side of the ring of teeth and the other part may be shifted to the opposite side, as indicated in Figs. 1, 2 and 6, with the result that during part of each cycle of operation of the drum the roller 45 will ride on the cam *a* and during the remainder of the cycle it will fail to do so. When the roller 45 is riding on the portion of the cam *a* located on the left of the teeth 25, Fig. 4, the contact spring 16 will be raised and out of engagement with the corresponding contact 69, and therefore, the circuit through this switch will be broken. When the roller 45 leaves the cam, the spring 16 will fall into engagement with the contact 69, thus closing the circuit. Inasmuch as the cam is flexible, the adjustment may be varied so that the portions of the cam on opposite sides of its ring of teeth may be varied, to assume any one of the various positions indicated in Fig. 6, for example, in connection with the cams *a*, *b*, *c*, *d*, *i*, *j*, or as indicated in Fig. 7 in connection with all of the cams. Therefore, in the diagrammatic illustration of Fig. 6, that portion of the cam which is located on the left hand side of the ring of teeth 25 represents an open circuit at the switch 16 through signals R (N-S) and G (E-W), whereas that portion of the cam that is on the opposite side of the ring of teeth represents a closed circuit through the same signals. This also applies with respect to all of the switches except the switches associated with the cams *i* and *j* each of which controls two circuits alternately. For example, when the spring 11' is in engagement with cam *i* the connection is broken between the spring 11' and the contact 12', but it is closed between the spring 11' and the contact 13', which latter is located on the opposite side of the spring 11' with respect to the contact 12'. In other words, the spring 11' operates between the two contacts 12' and 13'. Obviously, therefore, a circuit may be either opened or closed if so desired when a corresponding spring engages its corresponding cam, or vice versa.

As shown in Fig. 1, the signals are operated when the corresponding switch is closed by current flowing from the generator G over the conductor 70 to the contacts under the springs 16, 17, etc. and thence through said springs to the signals R, A, G, at the corresponding street intersections.

The drum and its coiled springs, therefore, form an exceedingly flexible controller, the cams of which may be, with very little effort, changed to assume any desired form so that the interval of closure or of interruption or both of any particular circuit may be changed as the occasion arises without the necessity of having to dismantle any of the apparatus. The only thing that is necessary is to stretch the spring forming the cam over the teeth of the drum and shift it into the desired position with respect to its ring of teeth.

Referring to Fig. 2, it will be seen that on either side of the rings of teeth 25 through 34 other rings of teeth are shown. These merely serve as partitions and are not essential to the operation of the device. If desired, these teeth may be omitted.

The means for rotating the drum 15 comprises a supporting shaft 59, which shaft is provided with a toothed wheel 58 adapted to be rotated in the direction indicated by the arrow, Fig. 1, by oscillating an arm 56. This latter is provided with pins 56a and 56b adapted to alternately engage the detents 58' on wheel 58 and thereby advance the wheel one tooth upon each oscillation of the arm 56, the latter being mounted to oscillate about the axis 57—57. The oscillation of this arm is adapted to be produced by means of the solenoid magnets M', N', which are connected with any suitable source of current G and with an impulse sender diagrammatically represented by the springs 3 and 4. These springs are adapted to be alternately carried into engagement with the contact 5 in any suitable manner, as for example by a pendulum, for alternately energizing the solenoids M', N'.

Referring to Fig. 9 I have shown here pins that may be substituted for the pins 56a and 56b, Fig. 1, as indicated in Fig. 2. For example, the pin 56a, Fig. 9, instead of being rigid with respect to the arm 56 is loosely held in place through a perforation therein by the coiled spring 66 as shown. With this arrangement when the pin strikes the teeth on the wheel 56 it yields and softens the stroke. By this means, therefore, the step by step mechanism that advances the drum is made less noisy and more durable.

Referring to Fig. 1, by operating the solenoids M', N' alternately, the drum 15 may be continuously rotated with the result that the springs 16, 17, 14' and 19 will be operated in cycles each in a manner determined and controlled by its corresponding cam a, b, c, d, with the result that the signals R, A, G, along streets X and Y will be operated in a corresponding order. For example, one order of operation is indicated in Fig. 6. Assuming that the rollers of the corresponding springs 16, 17, 14' and 19 travel from the bottom of the drawing toward the top (that is in the reverse direction of travel of the drum) the order of operation of the signals will be as follows: red east and west and green north and south. While this signal is on the amber signal east and west will appear. Green north and south, and red east and west, together with the amber east and west will then retire. Red north and south and green east and west will then be substituted. While this signal is on the amber north and south will appear. In due course the amber north and south; the red north and south; and the green east and west, will retire. At the same time, the green north and south and the red east and west will reappear. This cycle of operation is repeated with each revolution of the drum 4. While in Figs. 1 and 2 only four of the springs are shown connected to signals, in Fig. 7 eight of the springs are shown connected with signals. With this arrangement, assuming B to represent a bell, the order of operation is as follows:

Green east and west, red north and south; green east and west retires; bell east and west sounds and amber east and west appears; bell east and west retires; amber east and west retires; red north and south retires; green north and south appears; red east and west appears; green north and south retires; bell north and south sounds; amber north and south appears; bell north and south retires; red east and west retires; red north and south appears; green east and west appears. This cycle of operation is repeated with each revolution of the drum.

Referring to Fig. 6, in addition to the circuits extending to the signals there are indicated a pair of circuits associated with the cams i and j. These circuits may be used for controlling any suitable apparatus, such as, for example, for controlling a so-called reset apparatus, the object of which apparatus is to change the relations of the drums at various intersections, and has to do with the control of progression of the signals or non-progression so as to substitute one for the other whenever desired.

In Fig. 8 is diagrammatically represented an arrangement of the cams for controlling nine traffic signal circuits and two reset circuits. The order of operation of the signals in this figure is the same as heretofore, namely, in the order represented by reading the drawing from bottom to top.

While I have described the cams a, b, c, etc. as being each in the form of a resilient element adapted to be reshaped whenever desired with respect to the corresponding tooth ring, I do not confine myself to this construction as other arrangements may be used.

One modification is shown in Figs. 10 and 11 wherein a drum 71 is provided with a ring of holes in which a series of pins 72 may be plugged to build up a cam, or remove from said holes to reduce the size of the cam. By such means, therefore, a drum with cams similarly located as in Fig. 2 may be provided with the same flexibility. With such means when the signal circuit is to be interrupted the corresponding roller 45 will roll over such pins and when the roller reaches the section where the pins are removed as shown in Fig. 10, the roller leaves the pins and permits the circuit to be closed as shown. In such case, therefore, the variation is obtained not by switching a flexible member to the right or to the left of a given plane, but by inserting or removing pins in or from the path of the roller.

It will be understood that while I have elected to describe my invention in connection with certain specific forms of apparatus, I do not wish to be so limited inasmuch as I contemplate modifications and variations within the spirit of the invention and the scope of the claims contained herein.

What I claim as new and desire to secure by Letters Patent of the United States, is:

1. In a circuit controller, a switch, a cam for operating said switch, said cam consisting of a flexible body, a support for said cam, motor means for operating said support whereby the cam may be operated, and means on said support for holding said cam thereon in any one of a number of different forms whereby said switch may be differently operated by said cam.

2. In a circuit controller, a switch, a cam for operating said switch, said cam consisting of a flexible body in the form of a closed loop, a support for said cam, motor means for operating said support whereby the cam may be operated, and means on said support for holding said cam thereon in any one of a number of different forms whereby said switch may be differently operated by said cam, said support being in the form of a drum mounted to be rotated about the axis thereof by said motor, said cam being looped around said drum.

3. In a circuit controller, a switch, a cam for operating said switch, said cam consisting of a flexible body, a support for said cam, motor means for operating said support whereby the cam may be operated, and means on said support in permanent relation therewith for holding said cam on said support in any one of a number of different forms whereby said switch may be differently operated by said cam.

4. In a circuit controller, a circuit controlling switch, a cam for operating said switch, said cam consisting of a body of flexible material, a support for said body, said support being provided with means for holding the cam in a flexed condition on said support, whereby a portion of said body may be maintained in operative relation with respect to said switch and the remainder of said body may be maintained out of operative relation with respect to said switch.

5. In a circuit controller, a circuit controlling switch, a cam for operating said switch, said cam consisting of a body of flexible material, a support for said body, said support being provided with means for holding the cam in a flexed condition on said support along two parallel planes.

6. In a circuit controller, a circuit controlling switch, a cam for operating said switch, said cam consisting of a body of flexible material, a support for said body, said support being provided with means for holding the cam in a flexed condition on said support with alternate portions of the cam extending along two parallel planes.

7. In a circuit controller, a circuit controlling switch, a cam for operating said switch, said cam consisting of a body of flexible material, a support for said body, said support being provided with means for holding the cam in a flexed condition on said support with portions of the cam extending along a plane and with portions intermediate of said first portions in a second plane parallel to the first.

8. In a circuit controller, a switch, a cam for operating said switch, a support for said cam, motor means for operating said support whereby the cam may be operated, and means on said support for holding said cam on said support in any one of a number of different forms whereby said switch may be differently operated by said cam, said last means being in the form of a ring of projections about said drum and said cam consisting of a closed ring formed of a coiled spring looped around said drum and crossing said ring of projections.

9. In a circuit controller, a cam, an arm mounted to oscillate about an axis, a second arm mounted to oscillate about the same axis, means for interlocking the two arms against rotation about said axis with respect to each other, said arms being free to move from or toward each other along said axis, a circuit-closing contact on one of said arms, said other arm being provided with means for engaging the surface of said cam, and means for operating said cam, said cam, arms and contact being in operative relation whereby the operation of the cam will operate one of said arms and through the medium of the latter the other arm and its contact.

10. In a circuit controller, a switch, a cam for operating said switch, a support for said cam, motor means for operating said support about an axis whereby the cam may be operated in turn about the same axis and means associated with said support and cam for changing the length of the cam whereby the switch may be differently operated, said means being movable in a direction parallel with said axis.

11. In a circuit controller, a switch, a cam for operating said switch, a support for said cam, motor means for operating said support about an axis whereby the cam may be operated in turn about the same axis, and means associated with said support and cam for changing the length of the cam whereby the switch may be differently operated, said means being movable in a direction parallel with said axis, said means also for changing the position of the cam with respect to its support and whereby the interval of operation of the switch may be advanced or retarded.

12. In a circuit controller, a circuit controlling switch, a cam for operating said switch, a support for said cam mounted to operate and to carry the cam about an axis, and means for varying the size of said cam on said support whereby the switch may be variably operated, said means being movable in a direction parallel with said axis.

13. In a circuit controller, a circuit controlling switch, a cam for operating said switch, a support for said cam mounted to operate and to carry the cam about an axis, means for varying the size of said cam on said support by shifting elements of the cam in a direction parallel to said axis whereby the switch may be variably operated, said means also for varying the position of the cam on said support whereby the interval of operation of the switch may be advanced or retarded with respect to the support.

14. In a circuit controller, a switch, a cam for operating said switch, a support for said cam, motor means for operating said support whereby the cam may be operated in turn, and means whereby a portion of said cam may be shifted from one part of the support in the path of the switch to another part of the support out of the path of the switch.

15. In a circuit controller, a drum comprising means forming a plurality of circumferentially extending, axially spaced grooves, cam means mounted in said grooves, and means whereby the circumferential length of each cam means may be adjusted individually.

16. In a circuit controller, a drum, means for supporting on the drum a plurality of circumferentially extending, axially spaced cams, and means whereby the circumferential length of each cam may be adjusted individually.

17. In a circuit controller, a drum, a plurality of circumferentially extending, axially spaced cam supporting means on the drum, and cams carried by said cam supporting means, each cam comprising a plurality of removable elements placed adjacent to each other to form a cam of the desired circumferential length.

18. In a circuit controller, a drum comprising means forming a plurality of circumferentially extending, axially spaced grooves, and cams carried in said grooves, each cam comprising a plurality of removable elements placed adjacent to each other to form a cam of the desired circumferential length.

In witness whereof, I have hereto set my hand this 9th day of January, 1930.

CROMWELL A. B. HALVORSON.